Patented Feb. 10, 1953

2,627,938

UNITED STATES PATENT OFFICE 2,627,938

METHOD OF MAKING HIGH VISCOSITY PRODUCTS HAVING PETROLEUM OIL BASE AND PRODUCT OF SUCH METHOD

Stanley H. Frohmader and Virjean C. Archer, Madison, Wis., assignors to Research Products Corporation, Madison, Wis., a corporation of Wisconsin No Drawing. Application August 10, 1948, Serial No. 43,548

11 Claims. (Cl. 183—45)

This invention relates to a method of making high viscosity products having relatively low viscosity petroleum oil as the base, whereby valuable products are obtained which may vary from a high viscosity liquid to a plastic, paste-like solid. A specific use of the invention is the formation of the plastic, paste-like adhesive composition for application to the surfaces of an impingement type of air filter. Another use is for the making of salves, ointments and cosmetic creams. The invention also relates to the high viscosity products formed by the method.

An object of the invention is to provide a method of forming high viscosity products by thickening petroleum oil, which method is simple and inexpensive and is adapted for the ready control of the viscosity of the product.

Another object is to provide a method as stated in the foregoing object in which only a small amount of thickening agent is required.

Another object which has particular reference to the making of an air filter adhesive is to provide a high viscosity product of the character mentioned which has excellent dust catching properties.

Other and additional objects will become apparent as the following description progresses.

Briefly, the invention consists in dissolving polyethylene in the petroleum oil base and rapidly cooling the solution through a temperature range at which the solution changes from a substantially clear transparent liquid to one which is of turbid or cloudy consistency. In accordance with the invention it has been discovered that such rapid cooling results in a remarkable thickening effect such that a thin oil is converted into a thick paste with an amount of polyethylene as little as 2% of the composition.

A petroleum oil of any desired viscosity may be used as the base. In making salves, cosmetic creams, etc., a highly refined white oil is preferably used as the base. As the thickening agent, there may be used the polymerization product of ethylene having a molecular weight of 3,500 or more, as determined by the Williams Plastometer method, which is described in the Journal of Industrial and Engineering Chemistry, vol. 16, No. 4, page 362 (1924). It has been found that when using the same proportion of polymer the thickening effect increases as the molecular weight of the polymer is increased. It is desired to use a polymer having a molecular weight of at least 3,500 and those having a molecular weight of 7,000 to over 26,000 have been found to produce excellent results.

The proportion of polyethylene which is mixed with the petroleum oil may be varied over a wide range, depending upon the viscosity desired in the final composition. The thickening effect increases as the proportion of polyethylene is increased. Since the viscosity also increases as the molecular weight increases, as pointed out heretofore, the proportions required to produce the same thickening effect is less with the higher molecular weight polyethylene. The smallest amount of polyethylene produces some thickening effect, although it may be difficult to measure. With a molecular weight in excess of 3,500, it has been found that an amount as small as 1% of the composition produces a strong thickening effect. While any amount of polyethylene may be used as desired, it is not necessary to use an amount more than 10% of the composition to obtain a stiff solid mass with a low viscosity petroleum oil. Throughout the specification and claims, where proportions of polyethylene are set forth, they are based on the weight of the composition including the oil and the polyethylene.

As the first step in the process of producing a high viscosity product, the polyethylene is dispersed in the petroleum oil. While it is possible to accomplished the dispersion by milling a mixture of the oil and polymer together at ordinary room temperature, it is accomplished more readily by mixing the oil and the polymer together and heating the mixture with agitation at an elevated temperature, i. e., 75° C. or higher and preferably at 110° C. to 130° C. The polymer gradually dissolves in the oil until it completely disappears and a clear transparent liquid is obtained, at which time it is believed that the solution is substantially complete.

In the foregoing procedure the desired finel proportions of oil and polymer are mixed together initially and agitated until a clear solution is obtained. In accordance with a preferred procedure, a mixture of oil and polyethylene containing a higher concentration of polyethylene than is desired in the final product is first prepared and heated at an elevated temperature with agitation until all lumps and solid masses of the polyethylene disappear, and a highly viscous homogeneous mass is obtained. Oil is then added to form a solution of the desired final proportions. In this procedure, mixtures of certain proportions rather readily form a highly viscous homogeneous mass. With petroleum oil having a Saybolt viscosity of 300 at 38° C. (100° F.) and polyethylene having a molecular weight of 18,000 to 20,000 such a highly viscous mass is formed by a mixture containing from 20% to 50% of polyethylene. After the viscous mass is formed, oil is added to it with agitation until the desired final proportions are reached, when the addition of oil is stopped. Complete solution is obtained more readily in this manner than in the procedure in which the final proportions of oil and polymer are mixed together initially. The temperature for the operation of forming the viscous homogeneous mass is above 75° C. and preferably from 110° C. to 130° C. The temperature during the addition of the oil to the mass need not be elevated, but may be any temperature as desired.

After the solution has been formed as described, it is in the form of a liquid the viscosity of which is only slightly greater than that of the oil constituent thereof alone at the same temperature. It is then cooled rapidly through a proper range of temperature to obtain the pronounced increase in viscosity which is the object of the invention. The increase in viscosity is accompanied by a clouding effect in which the solution changes from a clear liquid to one which is definitely cloudy or turbid. There is a relationship between the thickening effect and the clouding effect whereby the two phenomena occur simultaneously and the clouding effect may be employed as a convenient means of control for obtaining the desired increase in viscosity. The temperature at which the clouding effect begins varies with polyethylenes of different molecular weight as follows:

| Molecular Weight | Temperature, °C. |
|---|---|
| 3,700 | 55 |
| 7,000 | 63 |
| 18,000 to 20,000 | 78 |
| 24,000 to 26,000 | 80 |

The clouding continues and the cloudiness increases with cooling over a range of several degrees. It is believed that this is because the molecular weight of the polyethylene is not exact but is rather the average of a range of molecular weights. Where a mixture of polyethylenes of different molecular weight is used the clouding occurs over a range of temperature. For example, if a mixture of polyethylenes having molecular weights of 3,700 and 20,000 is used, the clouding range is from 78° C. to 55° C. For simplicity, the range over which clouding occurs will herein in the specification and claims be called the cloud point.

The solution is first brought to a temperature above the cloud point and is then cooled rapidly by any suitable method of heat exchange to a temperature below the cloud point. For satisfactory results the cooling should be at a rate of at least one degree C. per minute. The thickening effect is remarkable under such circumstances and is more pronounced as the temperature range through which the dispersion is cooled is increased. Substantial thickening has been obtained by cooling over a range of 10 degrees C. With polyethylene of molecular weight up to 26,000, pronounced thickening has been obtained by cooling from a temperature of 80° C. or higher to a temperature of 35° C. or lower. The cooling is preferably carried down to room temperature, i. e., about 20° C. The thickening effect is also increased as the rapidity of cooling is increased. Substantial thickening has been obtained at a cooling rate of one degree C. per minute and progressively more pronounced thickening has been obtained at cooling rates of 3, 5 and 9 degrees C. per minute and higher. Remarkable results have been obtained by cooling at a rate of a thousand degrees C. per minute or more and rates as high as 8,000 degrees C. per minute have been used with success. In following the method of the invention, satisfactory results have been obtained by cooling from a temperature of 80° C. or higher to a temperature of 35° C. or lower in a space of one minute or less, and cooling through said temperature range has been accomplished in less than 0.1 minute. Such procedure provides a cooling rate of at least 45 degrees C. per minute.

In a satisfactory method of cooling, the heated solution is flowed in the form of a thin layer upon one surface of a thin sheet of highly heat conductive material such as metal, while the opposite surface is cooled by a suitable coolant such as water.

The following are examples of the method in accordance with the present invention, the first being directed to the making of an adhesive for filters for air and other gases and the second to the making of a cream base for salves, ointments and cosmetic creams. It is to be understood that the method of preparing high viscosity products from low viscosity petroleum oil for the preparation of the particular products involved is not restricted to the operations described in the examples.

*Example I*

A mixture is prepared containing 80% of petroleum oil having a Saybolt viscosity of 300 seconds at 38° C. and 20% of polyethylene having a molecular weight of 18,000 to 20,000. The mixture is heated at a temperature of 130° C. with agitation until a highly viscous homogeneous mass is obtained with substantially no excess of liquid oil. Additional oil is added to the mass with agitation until the concentration of the polyethylene has been reduced to about 2% of the composition. The agitation is continued until a clear transparent liquid is obtained. The said liquid solution may thereafter be stored at once or subjected at once to the rapid cooling operation. For this operation, its temperature is adjusted to 110° C. to 130° C. and it is then poured in the form of a thin layer upon the outer surface of a rotating drum composed of thin sheet metal. A stream of cold water, i. e., at a temperature of 35° C. or lower is directed against the interior surface of the drum whereby the latter is effectively cooled. Upon spreading out upon the drum surface the composition cools suddenly to substantially the temperature of the drum. In this procedure, the drop in temperature has been observed to occur in the space of less than 0.1 minute. The concentration of polyethylene in petroleum oil in the composition remains substantially unchanged during the cooling operation. After spreading out in the form of a layer, the composition thickens into a plastic, paste-like mass, and is then scraped from the drum by a suitable instrument into a container. The resulting composition is thixotropic and has a viscosity at 20° C. of approximately 900 poises, when measured by the Brookfield rotation viscosimeter at one R. P. M. The same solution of polyethylene in petroleum oil when allowed to cool slowly from a temperature of 110° C. to 130° C., that is, by allowing the heated solution to stand in an atmosphere at a temperature of 20° C. until it reaches the latter temperature, has a viscosity of approximately 30 poises when measured by the same method. This is the normal viscosity of the composition by which is meant the viscosity when it is not subjected to the rapid cooling procedure.

The thickened paste-like product is an excellent adhesive for an impingement type of filter for air and other gases. Filters of this character are well known and consist of a gas pervious interstitial body of filtering material which may be composed of vegetable or mineral fibers, animal hair or other interstitial material, such as the body of expanded sheet material disclosed in U. S. Patent 2,070,073. The adhesive is applied to the surfaces of the interstitial filtering material in accordance with methods which are well known and when so applied it does not drip off of the filtering material in storage and use and it possesses excellent dust catching properties. For this adhesive product, the petroleum oil base should have a Saybolt viscosity not in excess of 2,000 seconds at 38° C.

*Example II*

A mixture containing 80% of highly refined petroleum white oil having a Saybolt viscosity of 80 seconds at 38° C. and 20% of polyethylene having a molecular weight of 18,000 to 20,000 is heated with agitation at a temperature of 130° C. as in Example I until a highly viscous homogeneous mass is obtained. To this mass is added additional white oil until the concentration of the polyethylene has been reduced to 5% of the composition. The addition is accompanied by agitation and is continued until a clear transparent liquid is obtained. The temperature of the liquid is adjusted to 110° C. to 130° C. and it is subjected to a cooling operation similar to that described in connection with Example I. The resulting product is a plastic paste-like mass, suitable as a base for ointments, salves, cosmetic creams and the like. It may have the desired medicaments incorporated therein. It has a viscosity of 9,000 poises when measured by the method described in connection with Example I, while the same mixture if allowed to cool slowly has a viscosity of not over 100 poises, when measured in the same manner. For a product of this character the white oil base should have a Saybolt viscosity of not more than 350 seconds at 38° C.

The viscosity of the high viscosity product of the present invention is reduced by raising the temperature thereof from an initial temperature to which it has been rapidly cooled to a higher temperature. That is, the high viscosity produced by the rapid cooling is reduced by causing the temperature of the thickened product to be raised. The viscosity is increased only slightly and not to the former high value by again cooling the product slowly to the initial temperature, as by allowing it to stand in an atmosphere at such temperature. The reduction in viscosity is proportional to the degree to which the temperature is elevated, and heating to a temperature at which it becomes thinner than is desired should, therefore, be avoided.

While two examples of a method of making a high viscosity product are described herein, these are by way of illustration and variations thereof may be made within the scope of the invention as the same is set forth in the appended claims. For example, methods of heat exchange other than that described may be used. Also, it is not necessary to employ the extremely rapid cooling obtained in the examples, since a cooling rate of 1° or more per minute has been found to produce a substantial thickening effect. Also, while two plastic paste-like products are obtained in the examples, the invention is not limited thereto and other products may be obtained as well. Products of lower viscosity may be made where such products are desired, as for example, a product which is a viscous liquid, the viscosity of which may be high or low as desired. The invention provides a method for obtaining a wide range of viscosity and a wide range of products.

What is claimed is:

1. The method of making a thixotropic composition containing petroleum oil and polyethylene having an average molecular weight of at least 3500, which comprises preparing a solution of said polyethylene in said petroleum oil at a temperature above the cloud point of said solution, said polyethylene comprising approximately 1% to 10% of the combined weight of said polyethylene and said petroleum oil, and cooling said solution uniformly and without agitation at a rate of at least about 45 degrees C. per minute through a temperature range including the cloud point of said solution while maintaining the concentration of polyethylene in petroleum oil in said solution substantially unchanged.

2. The method of making a thixotropic composition containing petroleum oil and polyethylene having an average molecular weight of at least 3500, which comprises preparing a solution of said polyethylene in said petroleum oil at a temperature above the cloud point of said solution, said polyethylene comprising approximately 1% to 20% of the combined weight of said polyethylene and said petroleum oil, and cooling said solution uniformly and without agitation at a rate of at least about 45 degrees C. per minute through a temperature range including the cloud point of said solution while maintaining the concentration of polyethylene in petroleum oil in said solution substantially unchanged.

3. The method of making a thixotropic composition containing petroleum oil and polyethylene having an average molecular weight of at least 3500, which comprises preparing a solution of said polyethylene in said petroleum oil at a temperature of at least about 75° C., said polyethylene comprising approximately 1% to 10% of the combined weight of said polyethylene and said petroleum oil, and cooling the solution uniformly and without agitation at a rate of at least about 45 degrees C. per minute through a temperature range including the cloud point of said solution while maintaining the concentration of polyethylene in petroleum oil in said solution substantially unchanged.

4. The method of making a thixotropic composition containing petroleum oil and polyethylene having an average molecular weight of at least 3500, which comprises heating at a temperature above 75° C. with agitation a mixture of petroleum oil and polyethylene having a molecular weight of at least 3500, said mixture containing 20% to 50% by weight of said polyethylene, continuing said heating and agitation until said mixture becomes a homogeneous mass, adding petroleum oil to said mixture at said elevated temperature with agitation to form a clear liquid solution of said polyethylene in said oil, and cooling said solution uniformly and without agitation at a rate of at least about 45 degrees C. per minute through a temperature range including the cloud point of said solution while maintaining the concentration of polyethylene in petroleum oil in said solution substantially unchanged.

5. The method of making a thixotropic composition containing petroleum oil and polyethylene having an average molecular weight of at least 3500, which comprises preparing a solution of said polyethylene in said petroleum oil at a temperature above the cloud point of said solution, said polyethylene comprising approximately 1% to 10% of the combined weight of said polyethylene and said petroleum oil, and cooling said solution uniformly and without agitation at a rate of at least about 45 degrees C. per minute through a temperature range of at least ten degrees C. including the cloud point of said solution while maintaining the concentration of polyethylene in petroleum oil in said solution substantially unchanged.

6. The method of making a thixotropic composition containing petroleum oil and polyethylene having an average molecular weight of at least 3500, which comprises preparing a solution of said polyethylene in said petroleum oil at a temperature above the cloud point of said solution, said polyethylene comprising approximately 1% to 10% of the combined weight of said polyethylene and said petroleum oil, and bringing said solution in the form of a thin layer into contact with a surface maintained at a temperature below the cloud point of said solution whereby said solution is cooled at a rate of at least about 45 degrees C. per minute through a temperature range including the cloud point of said solution.

7. The method of making a thixotropic composition containing petroleum oil and polyethylene having an average molecular weight of at least 3500, which comprises preparing a solution of said polyethylene in said petroleum oil at a temperature above the cloud point of said solution, said polyethylene comprising approximately 1% to 10% of the combined weight of said polyethylene and said petroleum oil, and cooling said solution in the form of a thin layer at a rate of at least 45 degrees C. per minute through a temperature range including the cloud point of said solution.

8. A thixotropic composition of matter comprising petroleum oil containing dispersed therein polyethylene having an average molecular weight in excess of 3500, said composition being the inspissated product of cooling a liquid solution of said polyethylene in petroleum oil uniformly and without agitation at a rate of at least about 45 degrees C. per minute through a temperature range including the cloud point of said solution while maintaining the concentration of polyethylene in petroleum oil in said solution substantially unchanged, said solution containing approximately 1% to 10% of polyethylene, based on the combined weight of polyethylene and petroleum oil.

9. A thixotropic composition of matter comprising petroleum oil having a Saybolt viscosity of not more than approximately 2000 seconds at 38° C. containing dispersed therein polyethylene having an average molecular weight in excess of 3500, said composition being the inspissated product of cooling a liquid solution of said polyethylene in said petroleum oil uniformly and without agitation at a rate of at least about 45 degrees C. per minute through a temperature range including the cloud point of said solution while maintaining the concentration of polyethylene in petroleum oil in said solution substantially unchanged, said solution containing approximately 1% to 10% of polyethylene, based on the combined weight of polyethylene and petroleum oil.

10. A thixotropic composition of matter comprising petroleum white oil having a Saybolt viscosity of not more than approximately 350 seconds at 38° C. containing dispersed therein polyethylene having an average molecular weight in excess of 3500, said composition being the inspissated product of cooling a liquid solution of said polyethylene in petroleum oil uniformly and without agitation at a rate of at least about 45 degrees C. per minute through a temperature range including the cloud point of said solution, while maintaining the concentration of polyethylene in petroleum oil in said solution substantially unchanged during said cooling operation, said solution containing approximately 1% to 10% of polyethylene based on the combined weight of polyethylene and petroleum oil.

11. A gas filter comprising a gas-pervious interstitial base and an adhesive composition on said base comprising petroleum oil having dispersed therein polyethylene having a molecular weight in excess of 3500 in an amount equal to approximately 1% to 10% by weight of the composition, said composition being the inspissated product of cooling a liquid solution of said polyethylene in petroleum oil at a rate of at least 45 degrees C. per minute through a temperature range including the cloud point of said solution while maintaining the concentration of polyethylene in petroleum oil in said solution substantially unchanged.

STANLEY H. FROHMADER.
VIRJEAN C. ARCHER.

REFERENCES CITED

The following references are of record in the file of this patent:

UNITED STATES PATENTS

| Number | Name | Date |
| --- | --- | --- |
| 1,918,531 | Gentry | July 18, 1933 |
| 2,019,241 | Weiss | Oct. 29, 1935 |
| 2,062,090 | Gaarder et al. | Nov. 24, 1936 |
| 2,145,898 | Simpson | Feb. 7, 1939 |
| 2,336,195 | Sparks et al. | Dec. 7, 1943 |
| 2,384,848 | Peters | Sept. 18, 1945 |
| 2,414,300 | Hamilton | Jan. 14, 1947 |
| 2,430,861 | Carpenter et al. | Nov. 18, 1947 |

OTHER REFERENCES

"Alkathene," Imperial Chem. Ind. Ltd., November 1943, pp. 10 and 12.

"Polyethylene Resins," Carbide and Carbon Chem. Corp., 1944, page 11.

"Polyethylenes," Maibauer & Myers, preprint 90–36 of Electrical Chem. Soc., 1946, pages 460–461.